(12) United States Patent
Greene et al.

(10) Patent No.: US 6,724,961 B2
(45) Date of Patent: Apr. 20, 2004

(54) METHOD TO ASSEMBLE OPTICAL COMPONENTS TO A SUBSTRATE

(75) Inventors: John Greene, Chippewa Falls, WI (US); Steven C. Nelson, Fall Creek, WI (US); Ron Kunkel, Jim Falls, WI (US); Jane Novacek, Eau Claire, WI (US)

(73) Assignee: Corona Optical Systems, Inc., Lombard, IL (US)

( * ) Notice: Subject to any disclaimer, the term of this patent is extended or adjusted under 35 U.S.C. 154(b) by 0 days.

(21) Appl. No.: 10/075,142

(22) Filed: Feb. 14, 2002

(65) Prior Publication Data

US 2003/0152330 A1 Aug. 14, 2003

(51) Int. Cl.⁷ .................................................. G02B 6/26
(52) U.S. Cl. .............................. 385/52; 385/89; 385/91; 385/92
(58) Field of Search .............................. 385/14, 39, 52, 385/88, 89, 92, 90, 91

(56) References Cited

U.S. PATENT DOCUMENTS

| | | | | |
|---|---|---|---|---|
| 5,590,232 A | * | 12/1996 | Wentworth et al. | 385/92 |
| 5,631,988 A | * | 5/1997 | Swirhun et al. | 385/15 |
| 6,056,448 A | | 5/2000 | Sauter et al. | 385/92 |
| 6,236,788 B1 | * | 5/2001 | Moisel | 385/52 |
| 6,324,314 B1 | * | 11/2001 | Ukechi et al. | 385/14 |
| 6,356,686 B1 | | 3/2002 | Kuczynski | 385/39 |
| 6,400,857 B1 | | 6/2002 | Hatami-Hanza et al. | 385/14 |
| 6,547,454 B2 | * | 4/2003 | Wickman et al. | 385/88 |

* cited by examiner

*Primary Examiner*—John D. Lee
*Assistant Examiner*—Jennifer Doan
(74) *Attorney, Agent, or Firm*—Welsh & Katz, Ltd.

(57) ABSTRACT

A method and apparatus are provided for aligning an optical array with a substrate. The method includes the steps of aligning the substrate with a set of alignment structures on an alignment fixture, transmitting a plurality of optical signals from the fixture through the substrate, and automatically aligning the optical array to the substrate using the transmitted plurality of optical signals and a pick and place machine.

31 Claims, 7 Drawing Sheets

METHOD TO ASSEMBLE OPTICAL COMPONENTS TO A SUBSTRATE

FIELD OF THE INVENTION

The field of the invention relates to optoelectric data transmission systems, and to interconnection of optical subassemblies.

BACKGROUND OF THE INVENTION

The use of optical fibers continues to increase in future generation communications technology. One important aspect of optical fiber technology is the interconnecting of optical fibers with optical devices such as photodetectors and semiconductor lasers. The interconnections are important for optical devices that either receive optical energy from optical fibers or devices that transmit optical energy to optical fibers. An interconnect substrate is often used to connect passive and active optical components. Presently, coupling of an optical device, interconnect substrate, and optical fibers can be a difficult task. Using manual or semi manual methods have several problems including complexity and inefficiency, thus making high volume production difficult.

In order to minimize optical alignment losses in multi-mode optical fiber, a placement tolerance of +/−5 micrometers is needed. In addition, the 3 standard deviation alignment tolerances of single-mode optical fiber is less than 1 micron. Thus, there is a need for high precision alignment and placement of optical components. To achieve this alignment tolerance, active alignment and complex vision systems are often used. Yet, this alignment requirement reduces manufacturing output and yield, making optical assemblies more costly than traditional electronic packaging techniques.

By comparison, electronic packaging assemblers use pick-and-place methodology to position components for subsequent assembly processes. Components are picked from a component holder and placed on a substrate to within 25 microns of an absolute reference position. This alignment tolerance is 5 times greater than required for low-loss optical interconnects.

As previously stated the conventional method of aligning optical fibers to optical devices is active alignment. To couple a semiconductor laser to an optical fiber by active alignment, the laser is activated to emit optical energy. A coupling end of the optical fiber is then placed near a light-emitting surface of the laser to receive optical energy, and a photodetector is placed at the other end of the fiber to detect the amount of optical energy that is coupled into the fiber. The position of the laser is then manipulated around the coupling end of the fiber until the photo detector at the other end of the fiber detects maximum optical energy. An epoxy is then applied to both the laser and coupling end of the fiber to permanently maintain the optical coupling. This method of alignment as described can be complicated and may reduce manufacturing efficiency.

In this patent is described a detailed methodology to simplify optical component assembly, couple light between optical components more efficiently, increase component assembly yields, and minimize optical alignment tolerance stack up.

SUMMARY OF THE INVENTION

A method and apparatus are provided for aligning an optical array with a substrate. The method includes the steps of aligning the substrate with a set of alignment structures on an alignment fixture, transmitting a plurality of optical signals from the fixture through the substrate, and automatically aligning the optical array to the substrate using the transmitted plurality of optical signals and a pick and place machine.

DETAILED DESCRIPTION OF A PREFERRED EMBODIMENT

Figure 1:
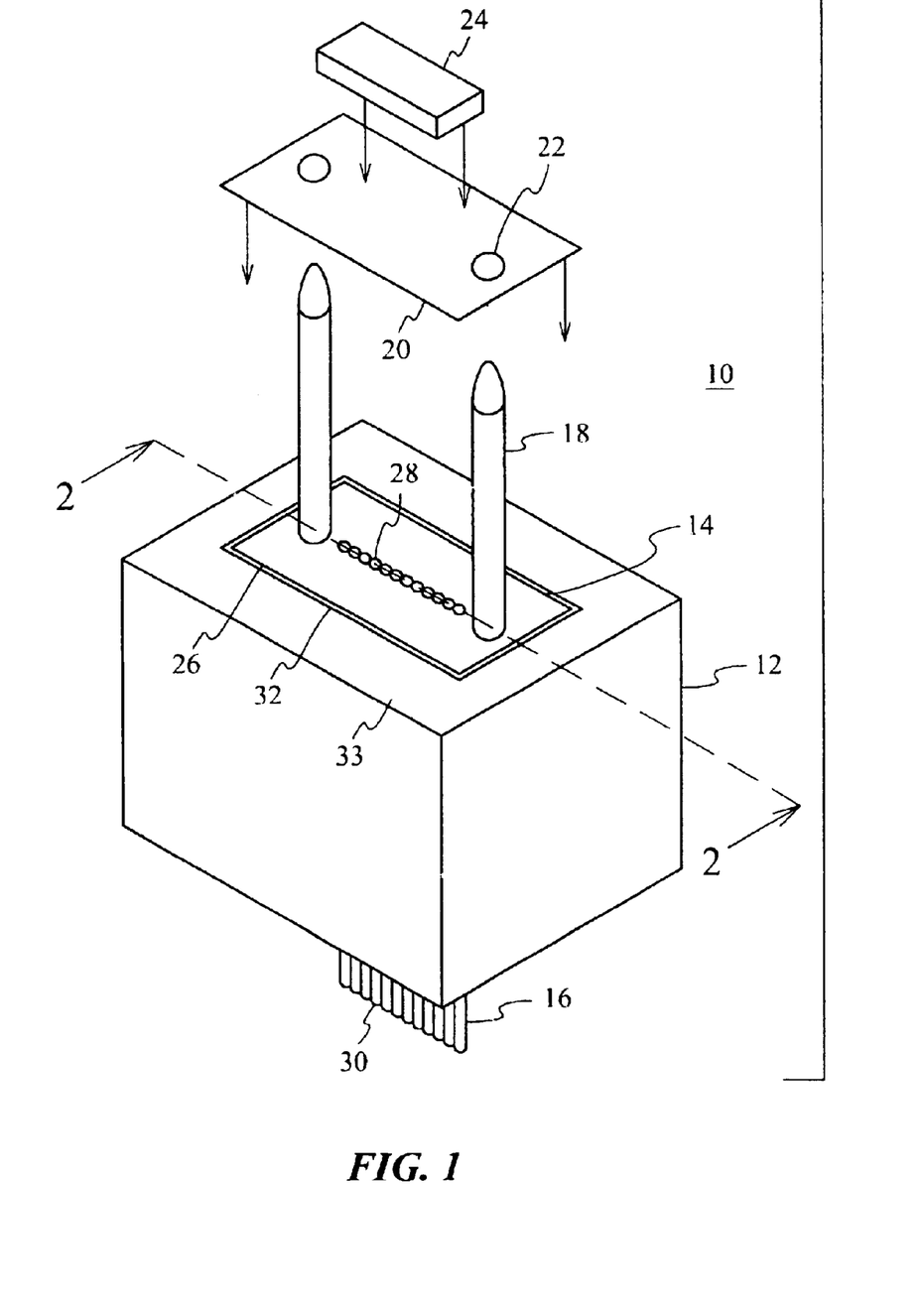
FIG. 1 depicts an exploded isometric view of a optical alignment assembly
Figure 2:
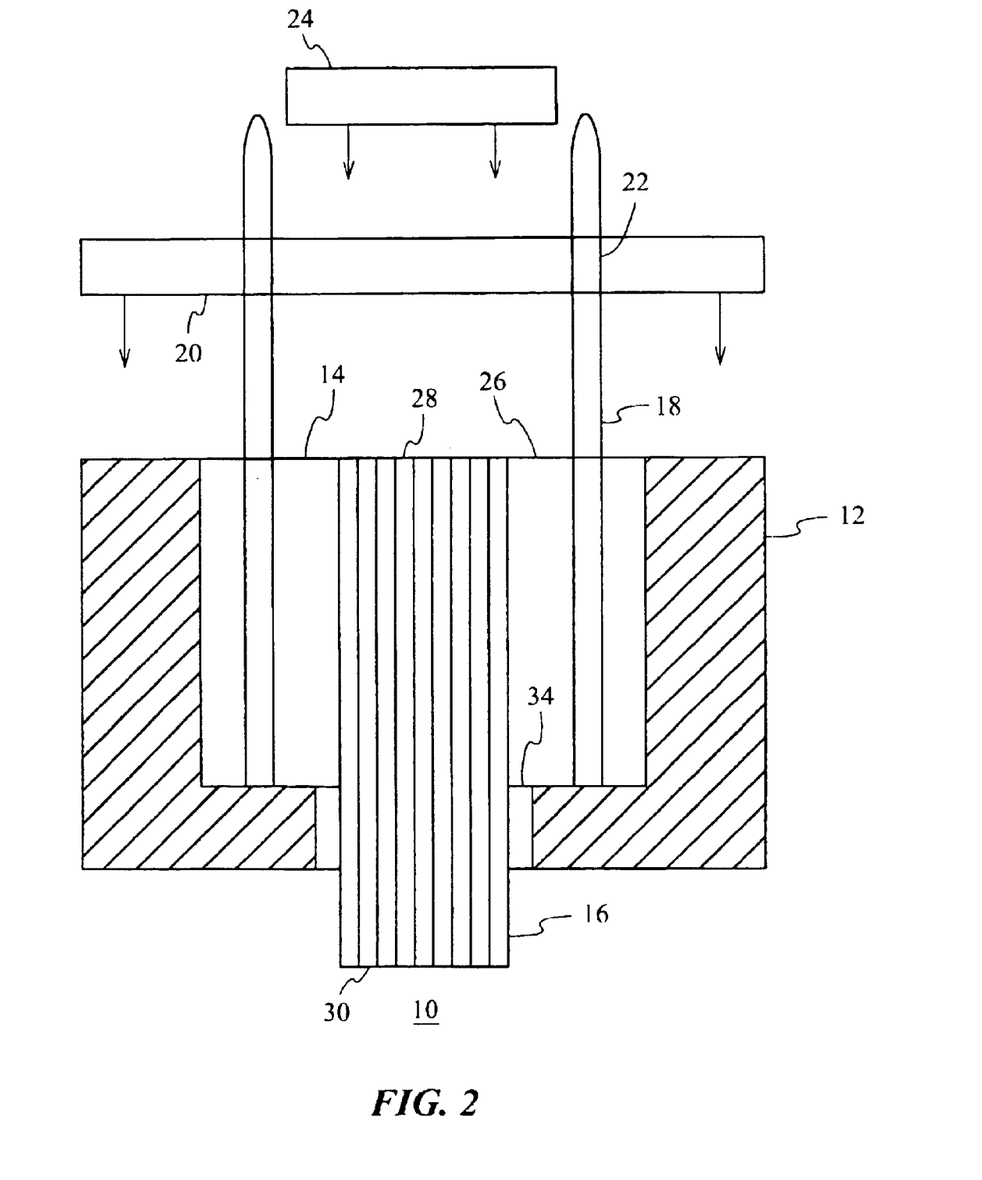
FIG. 2 depicts a front cut-away view of the optical alignment assembly of FIG. 1
Figure 3:
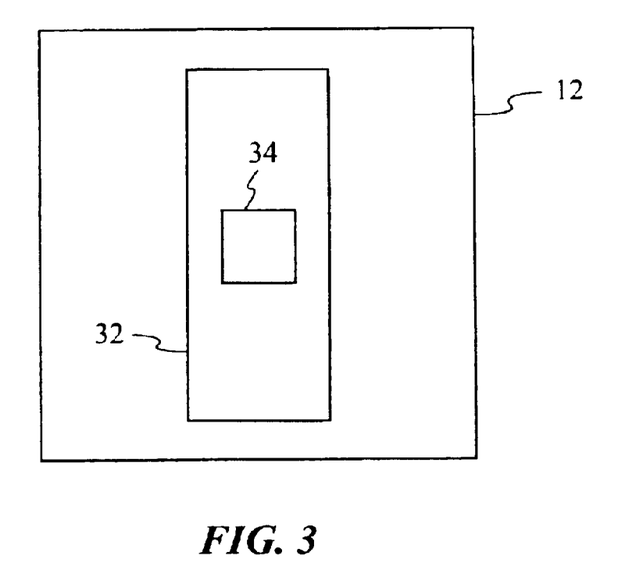
FIG. 3 depicts a top view of the alignment fixture of FIG. 1.

FIG. 1 shows an alignment assembly 10 for use with optical communications devices, generally in accordance with an illustrated embodiment of the present invention. The alignment assembly 10 may comprise a fixture 12 for holding an optical connector 14, an optical array 24, and an interconnect substrate 20 to which the optical array 24 may be attached. The alignment fixture 12 may comprise a rigid block having a receptacle 32 for holding the optical connector 14 (FIGS. 1–3). The block could be made of a metal or plastic having suitable structural properties, and it could be fabricated by conventional machining, molding, forging, or casting procedures.

FIG. 2 shows a cross sectional view of the optical alignment assembly 10 taken along line 2—2 of FIG. 1. The optical connector 14 may have a first surface 26 and hold a plurality of optical fibers 16. Each of the plurality of optical fibers 16 may contain a first coupling end 28, and the plurality of coupling ends 28 may lie coincident with the first surface of the optical connector 26, as shown in FIGS. 1 and 2. A top surface of the fixture 33 may also lie coincident with the surface of the connector 26, as shown in FIG. 2.

The optical connector 14 should fit securely into the receptacle 32 of the fixture 12 and stay relatively stationary. Fastening devices (not shown) such as screws, glue, clamps, etc. may be used to secure the optical connector 14 within the fixture 12.

Turning to FIG. 3, the alignment fixture 12 may also contain an aperture 34 through which optical fibers 16 of the optical connector 14 may project, as also shown in FIGS. 1 and 2. The aperture 34 is shown on the bottom of the fixture 12, but the aperture 34 could be located on any side surface of the fixture 12 as well.

Turning back to FIGS. 1 and 2, the optical connector 14 may contain alignment guide pins 18 as shown in FIG. 1. The guide pins 18 may be used to align the ends 28 of the optical fibers 16 with the optical array 24. The guide pins 18 may protrude from the first surface of the connector 26. The pins 18 could comprise a metal or plastic material having adequate strength and wear resistance. The number and size of the guide pins 18 is not limited in any way, but two guide pins 18 are used in a preferred embodiment of the invention. The pins 18 could be manually inserted into the optical connector 14. It is to be understood that the guide pins 18 are located at a predetermined lateral distance from the optical coupling ends 28 of the optical fibers 16.

In a preferred embodiment of the invention, the optical connector 14 is a standard MT connector/ferrule manufactured by US Conec or Nippon Telephone & Telegraph (US Conec Part number MTF-12MM7). The MT connector manufactured by US Conec is adapted to hold twelve optical fibers 16 in a ribbon cable form. The MT connector is also adapted to hold 2 guide pins 18 at a precise, known distance from the optical fibers 16. In a preferred embodiment of the invention, the placement tolerance of the guide pins 18 to the optical fibers 16 is less than 1 micron. The invention is not limited to any particular number, size, or form of optical fibers 16 held in place by the connector though.

In an alternate embodiment of the present invention, the elements of the optical connector 14 may be fabricated into the alignment fixture 12. That is, the fixture does not necessarily have the receptacle for holding the optical connector, but instead is manufactured to include the optical fibers and guide pins, as shown in the figures. The optical fibers and guide pins could be fabricated into the fixture by any conventional procedure. The advantage of fabricating the fixture this way eliminates the need for additional components. If fabricated as such, the placement tolerance of the guide pins and optical fibers should be less than 1 micron, as stated before.

Continuing, FIGS. 1 and 2 also show a substrate 20 with alignment apertures 22 for receiving the guide pins 18 of the optical connector 14. Accordingly, the number of alignment apertures 22 may correspond to the number of guide pins 18 protruding from the optical connector 14. Likewise, the spacing of the apertures 22 corresponds to the spacing of the guide pins 18 in the connector 14. Also shown in FIGS. 1 and 2 is an optical array 24, which may be attached to a first surface 36 (shown in FIG. 4) of the substrate 20. The details of aligning the optical array 24 to the connector 14 and attaching it to the substrate 20 will be described in more detail below.

As stated before, the distance from the optical fibers 16 to the guide pins 18 of the connector 14 is known. If the optical array 24 is aligned with the optical fibers 16, then the array 24 is also aligned at a known distance from the guide pins 18 and corresponding apertures 22 of the substrate 20.

Figure 4:
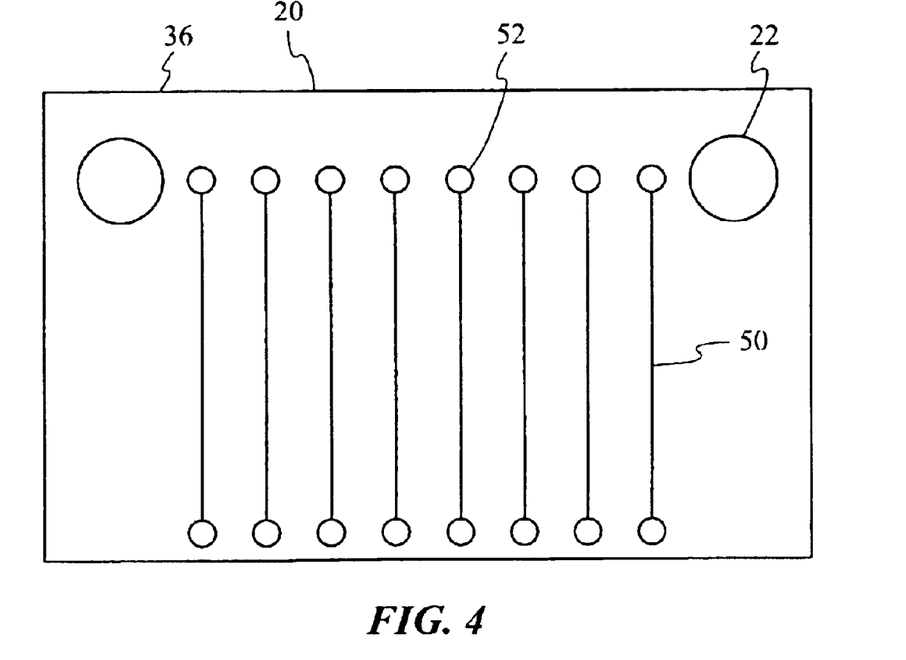
FIG. 4 depicts the interconnect substrate.

FIG. 4 shows a top view of the first surface 36 of the substrate 20. In addition to the apertures 22, a plurality of electrical traces 50 and contacts 52 may be disposed on the substrate 20. The traces 50 and contacts 52 may be used for electrically connecting the optical array 24 to other optical processing devices (not shown) located on the substrate 20 or on another substrate. The traces 50 and contacts 52 may be fabricated by any conventional procedure, such as photolithography.

In a preferred embodiment of the present invention, the placement tolerance between the apertures 22 and the conductive traces/contacts 50, 52 on the substrate 20 is roughly 25 microns. In addition, the order of placement for the traces/contact 50, 52 and apertures 22 is not restricted. For example, if the apertures are created in the substrate 20 before the traces 50 and contacts 52 are placed in the substrate 20, then the traces 50 and contacts 52 should be placed within 25 microns of the nominal position with respect the position of the apertures 22. If the traces 50 and contacts 52 are placed on the substrate 20 before apertures 22, the apertures should be placed within 25 microns of the nominal position with respect to the traces 50 and contacts 52. Since the optical array 24 is aligned to the apertures 22 in the substrate 20, the array 24 will automatically be aligned to make contact in the correct position with the traces/contacts 50 and 52 on the substrate.

If the guide pin apertures 22 or traces/contacts 50, 52 are incorrectly positioned with respect to the other (i.e., beyond 25 microns from their nominal position), then electrical contacts on the optical array 24 (shown in FIG. 7) may not contact the appropriate electrical contacts 52 on the substrate 20 when the optical array 24 is placed on the substrate 20.

Details of the substrate will now be described in further detail. The substrate 20 could be fabricated from any suitable material with adequate structural and optical properties. The substrate 20 could be an optically transparent, or optically opaque material. If the substrate 20 is opaque, or if an adequate amount of light energy is not transmissive through the substrate 20, an optical slot (not shown in the figures) may be placed in the substrate to allow transmission of light. The slot could be formed using any appropriate conventional technique.

The substrate 20 could comprise a thin, flexible material coupled with a layer providing additional strength, such as glass. Polyimide is a representative flexible material and is typically found under trades names such as "UPLEX" or "KAPTON." Other suitable materials include, but are not necessarily limited to, polyester materials (lower in cost and performance than polyimide), Mylar materials, and composite materials. In a preferred embodiment of the invention, the substrate 20 comprises glass, with no additional layers being used. With the use of an optically transparent glass, optical signals may transmit through, without the use of an optical slot. Additional materials having better adhesive and structural properties could be coupled with the glass though.

Figure 5:
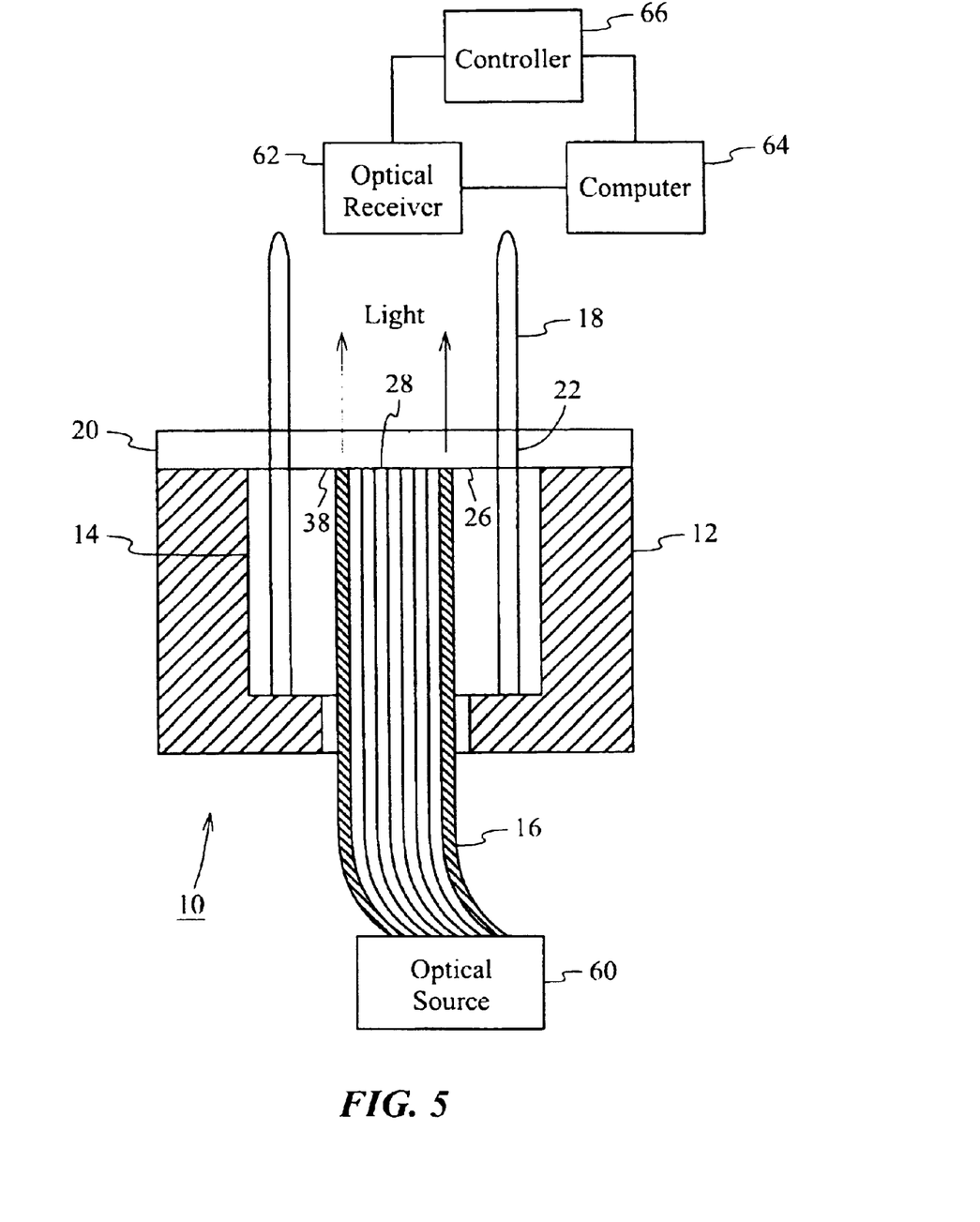
FIG. 5 depicts pick and place machinery and the optical alignment assembly of FIG. 2.

The details of optical alignment between the optical array 24 and the alignment fixture 12 will now be described in further detail. FIG. 5 illustrates the substrate 20 placed on the alignment fixture 12 and the optical connector 14. Specifically, the second surface 38 of the substrate 20 is shown coincident with the surface 26 of the optical connector 14, a first coupling end 28 of the optical fibers 16, and the top of the fixture 12.

Attached to a second coupling end 30 of the optical fibers 16 is an optical source 60 that may transmit light through some of the optical fibers 16 and through the substrate 20. If the substrate is not optically transparent, light from the optical source 60 may be transmitted through the optical slot (not shown) previously mentioned. If the substrate 20 is optically transparent, the light from the optical source 60 may transmit directly through a body of the substrate 20.

The optical source 60 could be a laser emitter of any type and wavelength, compatible with an optical receiver 62 described further on. In a preferred embodiment of the invention, light is transmitted through the outer two optical fibers 16 as shown. Yet, any number or combination of fibers may be used to transmit light.

Near the first end 28 of the optical fibers 16 may be the optical receiver 62. The receiver 62 could be connected to a pick and place computer 64 that stores information collected from the receiver 62. The pick and place computer 64 instructs the receiver 62 to look for specific reference marks. These reference marks may be programmed into the pick and place computer 64. In a preferred embodiment of the invention, the reference marks are the optical signals transmitted through the optical fibers.

The receiver 62 may be connected to the controller 66 which functions to move and position the receiver 62 until it detects the marks it looks for. When the receiver 62 receives light energy, the computer 64 identifies and stores the location of the receiver 62 (i.e., the computer 64 stores the relative position of the receiver 62 in an x-y plane created by the surfaces of the substrate 20).

It is to be understood that not only does the computer 64 store the location of the receiver, but the location of the light striking the receiver 62 and of the coupling end of the optical fibers 28 from which the optical signal emits. Thus, the light transmitting through the fibers 16 acts as identifying marks for locating the position of the optical fibers 16. Since the distances between the optical fibers 16 and the alignment guide pins 18 are known, the location of the alignment guide pins 18 in the plane created by the surfaces of the substrate 20 is then known. For simplicity, the plane created by the surfaces of the substrate 20 will hereon be referred to as the horizontal plane.

Figure 6:
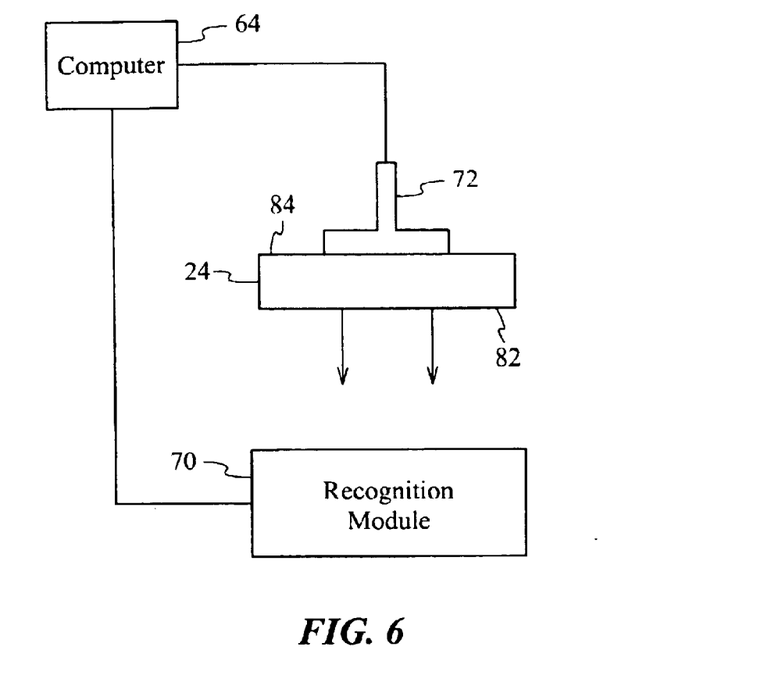
FIG. 6 depicts a recognition module, pick and place machinery, and an optical array.

Turning now to FIG. 6, the optical array 24 is shown with a conventional recognition module 70. The recognition module 70 and a conventional pick and place arm 72 may be connected to the pick and place computer system 64. The pick and place arm 72 holds the optical array 24 on a second surface 84, such that the recognition module 70 sees an active surface 82 of the optical array 24, as shown in the figure. The module 70 may include software adapted to recognize targets or fiducial marks 80 (shown in FIG. 7) on the optical array 24.

Figure 7:
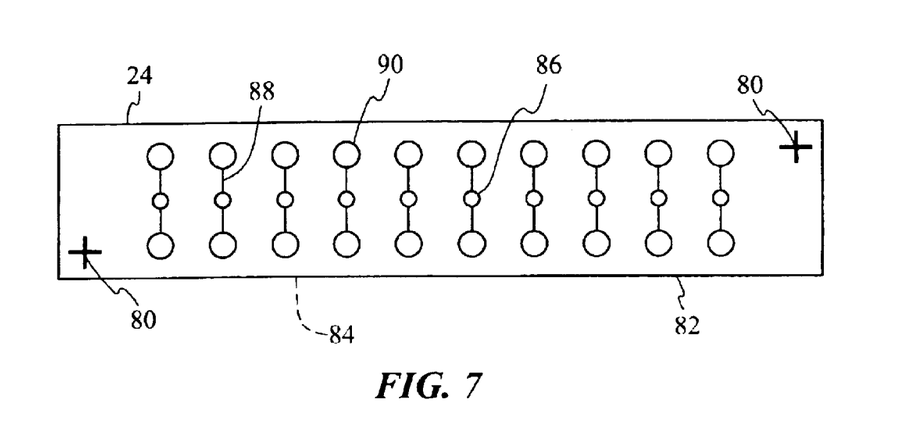
FIG. 7 depicts the surface of the optical array that emits light energy.

FIG. 7 shows the active surface 82 of the array 24 having registration targets or fiducials, located at predetermined and pre-programmed distances from optical ports 86. The pick and place computer 64 is programmed to look for registration marks 80, and the computer 64 instructs the module 70 to position itself until it locates the pre-programmed registration marks 80. When the module 70 identifies the registration marks 80, the computer 64 identifies and stores the location of the marks 80 in the horizontal plane.

The first surface 82 may also contain a plurality of optical ports 86, electrical traces 88, and electrical contacts 90 (as shown in FIG. 7). The optical ports 86 may transmit optical signals to be transferred through the optical fibers 16. The traces 88 and contacts 90 may be used to electrically connect the ports 86 to a signal driver (not shown). Also on the surface 82 of the array 24 are the recognition marks 80. In a preferred embodiment of the invention, two marks 80 are placed on the substrate in opposing corners. The specification of the recognition marks 80 is not limited in any way. The marks 80 could be of any number, size, and location on the optical array 24. In a preferred embodiment of the invention, the marks 80 are fabricated using conventional photolithography techniques. The marks 80 shown in FIG. 7 may be a thin layer of polyimide or metalization deposited on the surface 82 of the array 24, (i.e., the polyimide may be a few microns thick, and the metallization may be a few angstroms thick). Yet, any type of mark identifiable by a recognition module may be used.

In an alternate embodiment of the present invention, the optical ports 86 of the optical array 24 could be used as the registration marks 80, rather than a relatively thin deposited layer of an appropriate material. The recognition module 70 would then be programmed to look for optical ports 86 rather than marks located elsewhere, as shown in the figures. This could in turn reduce cost and eliminate a manufacturing step.

The distances from the registration marks 80 to the outer boundaries of the optical array 24 may be programmed into the pick and place machinery computer 64. In addition, the distances from the registration marks 80 to the optical ports 86 may also be predetermined and programmed into the pick and place machinery 64. When the pick and place computer system 64 identifies the location of the registration marks 80 in the horizontal plane, it also knows the location of the optical ports 86 in the horizontal plane. Thus, the delivered location of the optical array 24 by the pick and place machinery is known.

Figure 8:
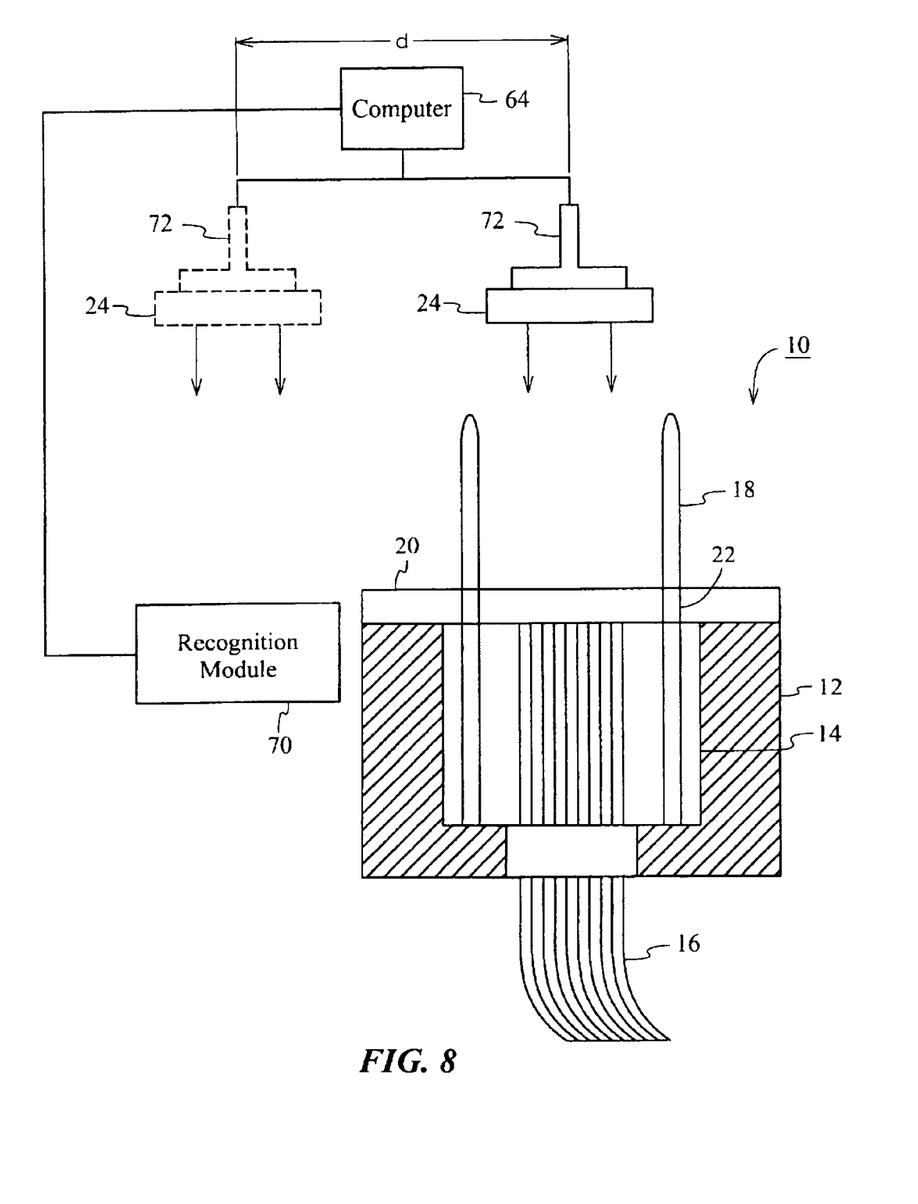
FIG. 8 depicts another view of the pick and place machinery and optical alignment assembly of FIG. 2.

Turning now to FIG. 8, details of the final alignment process will now be described in further detail. The figure shows the alignment assembly 10 with the pick and place arm 72 holding the optical array 24. The optical array 24 and pick and place arm 72 shown with hidden lines represent the initial position of the array 24, when the recognition module 70 is looking for the registration marks 80. After the module 70 and computer system 64 locate the position of the optical array 24 in the horizontal plane, the system 64 computes the distance 'd' separating the optical array 24 from its correct placement point. The correct placement point is determined from the location of the optical signals transmitting through the plurality of optical fibers 16 in the fixture 12. In other words, the computer 64 has programmed into it the distance the registration marks 80 and optical signals transmitted through the fibers 16 should be from each other in the horizontal plane. Given this distance, the computer 64 can then determine the distance 'd' to move the optical array 24 into its correct position in the horizontal plane.

The computer 64 instructs the pick and place arm 72 to move the optical array 24 the distance 'd', and attach the optical array 24 to the substrate 20. Hence, upon moving the array 24 the distance 'd', the transmission paths of the optical ports 86 are collinear with the longitudinal axis (i.e., transmission paths) of the respective plurality of optical fibers 16. A corollary effect is that each optical port 86 is also precisely aligned with the apertures 22 of the substrate 20.

Before the actual placement of optical array 24 to the substrate 20, the pick and place arm 72 may dip the optical die into an isotropic conductive adhesive (not shown) and bond it to the substrate 20. The adhesive could also be applied using a dispenser or a stencil containing proper apertures. Anisotropic conductive adhesive could be used in place of the isotropic conductive adhesive. In addition, the bonding process is not limited to these two adhesives, but also includes solder bonding, ultrasonic bonding, tape automated bonding, and eutectic bonding.

When the pick and place arm places the optical array 24 on the substrate, the electrical contacts 90 on the optical array 24 come in contact with the electrical pads 50 disposed on the substrate 20. In a preferred embodiment of the invention, the optical array 24 has a plurality of stud bumps 90 that establish electrical connections with the contacts 50 on the substrate 20. The adhesive may be applied to the stud bumps 90 of the array 24 or to the contacts 50 on the first surface of the substrate 20.

Since the alignment tolerances of the optical array 24 to the substrate 20, with respect to the conductive traces/contacts on the substrate 20, are substantially higher than the optical alignment tolerances, the electrical contacts of the array 24 and substrate 20 appropriately make contact when the pick and place arm positions the array 24 on the substrate 20.

Together, the optical array 24 and possibly a signal driver (not shown) attached to the substrate 20 compose an optical subassembly 92. While still in the fixture an optically transparent underfill could be applied to the optical array. Additional components could be attached to the substrate and bonded as appropriate. If necessary, the optical array 24 and additional components could be wire bonded to complete the electrical requirements. It is to be understood that any adhesives and underfills may also be cured while the optical subassembly 92 is attached to the fixture 12.

Figure 9:
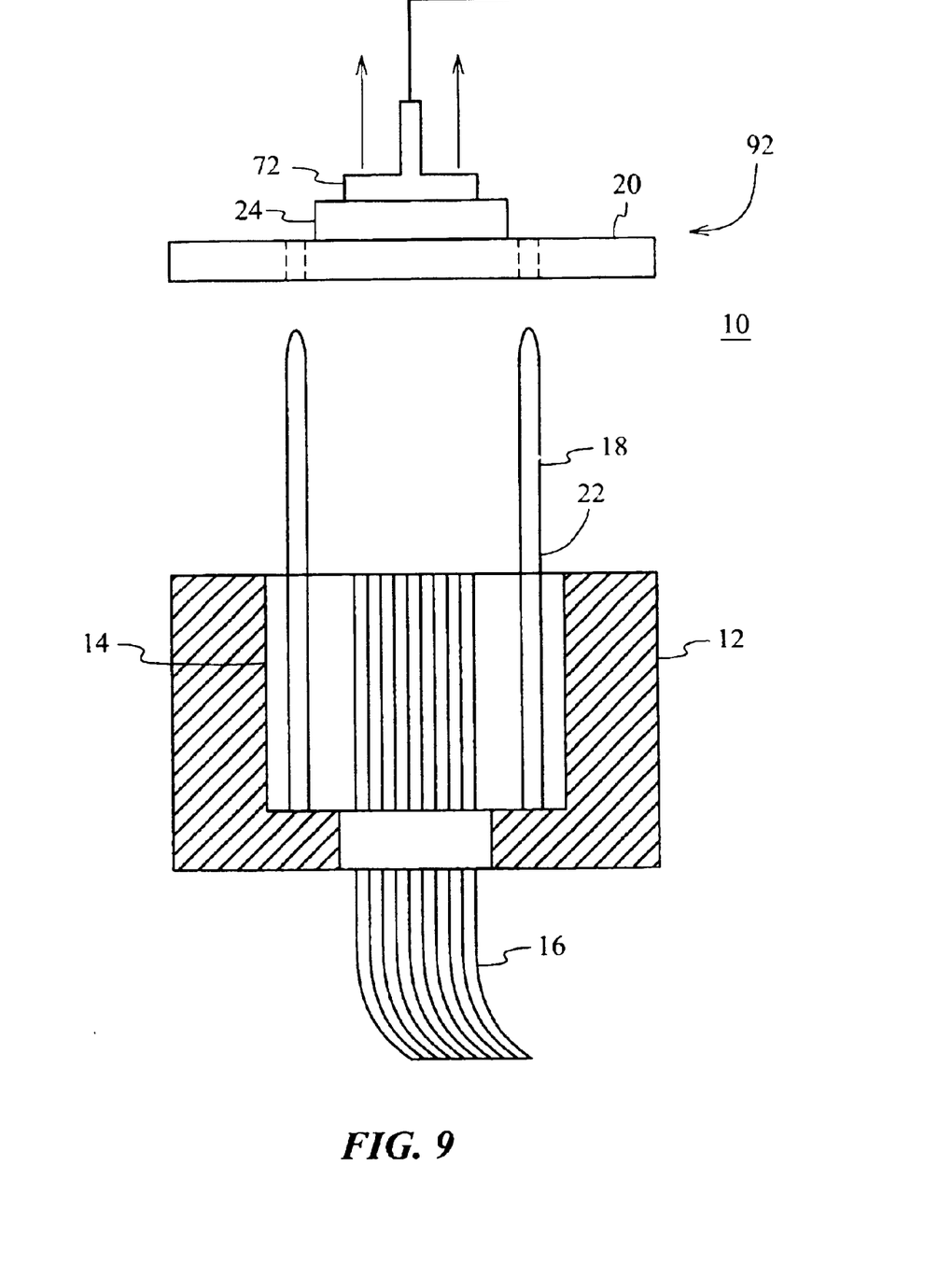
FIG. 9 is another view of the optical alignment assembly.

Turning to FIG. 9, upon completion of optical alignment and adhesion of the optical array 24 to the substrate 20, the substrate 20 may be removed from the alignment fixture 12 and further assembled as appropriate. The alignment fixture 12 may then be used to complete alignment of additional optical subassemblies. The process described above can expedite the manufacturing and assembly process of optical subassemblies. It can in turn increase output and yield, thus decreasing the cost as compared to traditional alignment and packaging techniques.

A specific embodiment of a method and apparatus for aligning an optical array with a substrate has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

What is claimed is:

1. A method of aligning an optical array with a substrate, such method comprising the steps of:
   aligning the substrate with a set of alignment structures on an alignment fixture;
   transmitting a plurality of optical signals from the fixture through the aligned substrate;
   determining a location of the transmitted optical signals;
   determining a location of the optical array; and
   automatically aligning the optical array to the substrate based upon the determined locations of the transmitted plurality of optical signals and optical array using a pick and place machine.

2. The method of aligning an optical array with a substrate as in claim 1 further comprising defining the set of alignment structures as a plurality of passive alignment guide pins protruding from a top surface of the alignment fixture.

3. The method of aligning an optical array with a substrate as in claim 2 wherein the step of aligning the substrate with a set of alignment structures on an alignment fixture further comprises inserting the plurality of guide pins of the alignment fixture through a respective plurality of apertures in the substrate.

4. The method of aligning an optical array with a substrate as in claim 3 wherein the step of transmitting a plurality of optical signals through the substrate further comprises transmitting the plurality of optical signals directly through an optically transparent substrate.

5. The method of aligning an optical array with a substrate as in claim 3 further comprising identifying the plurality of optical signals transmitted from the fixture with a first optical detector, for locating the position of the optical signals in a reference plane created by the substrate.

6. The method of aligning an optical array with a substrate as in claim 5 further comprising identifying a plurality of reference marks on the optical array with a second optical detector, for locating and properly aligning the array to the substrate.

7. The method of aligning an optical array with a substrate as in claim 6 further comprising defining the second plurality of registration marks on the substrate as a substantially thin layer of metal.

8. The method of aligning an optical array with a substrate as in claim 7 wherein the step of automatically aligning the optical array to the substrate further comprises aligning the plurality of reference marks on the optical array to specific distance from the plurality of transmitted optical signals in the reference plane created by the substrate.

9. The method of aligning an optical array with a substrate as in claim 8 further comprising attaching the optical array to the substrate with an adhesive.

10. The method of aligning an optical array with a substrate as in claim 9 further comprising disposing a set of conductive traces on the substrate for electrically connecting the optical array.

11. An apparatus for aligning an optical array with a substrate, such apparatus comprising:
    a substrate aligned with a set of alignment structures on an alignment fixture;
    a plurality of optical signals transmitted from the alignment fixture through the substrate; and
    a pick and place machine adapted to align the optical array to the substrate using the transmitted plurality of optical signals.

12. The apparatus for aligning an optical array with a substrate as in claim 11 wherein the alignment structures on the alignment fixture are further defined as alignment guide pins protruding from a top surface of the fixture.

13. The apparatus for aligning an optical array with a substrate as in claim 12 further comprising a set of alignment apertures disposed in the substrate such that the alignment guide pins of the fixture insert through the set of apertures in the substrate.

14. The apparatus for aligning an optical array with a substrate as in claim 13 wherein the substrate further comprises an optically transparent substrate such that the plurality of optical signals pass directly through the substrate.

15. The apparatus for aligning an optical array with a substrate as in claim 13 further comprising a means for identifying a plurality of registration marks on the optical array in a plane created by the substrate.

16. The apparatus for aligning an optical array with a substrate as in claim 15 wherein the plurality of registration marks disposed on the optical array are further defined as a substantially thin layer of metal.

17. The apparatus for aligning an optical array with a substrate as in claim 16 further comprising a means for identifying the plurality of optical signals transmitted through the substrate for locating the position of the optical signals in the plane created by the substrate.

18. The apparatus for aligning an optical array with a substrate as in claim 17 further comprising an adhesive for attaching the optical array to the substrate.

19. The apparatus for aligning an optical array with a substrate as in claim 18 further comprising a set of conductive traces disposed on the substrate for electrically connecting the optical array.

20. A method of aligning an optical array with a substrate, such method comprising the steps of:
    providing a substrate aligned to an alignment fixture;
    identifying a first plurality of registration marks in the alignment fixture with a first recognition module;
    identifying a second plurality of registration marks on the optical array with a second recognition module; and attaching the optical array to the substrate, such that the first plurality of registration marks of the optical array are located at a known distance from the second plurality of registration marks in the alignment fixture, with respect to a plane created by a first surface of the alignment fixture.

21. The method of aligning an optical array with a substrate as in claim 20 further comprising defining the first plurality of registration marks in the alignment fixture as a plurality of optical signals transmitted from the alignment fixture through the substrate.

22. The method of aligning an optical array with a substrate as in claim 21 further comprising transmitting the plurality of optical signals directly through an optically transparent substrate.

23. The method of aligning an optical array with a substrate as in claim 21 further comprising defining the second plurality of registration marks on the substrate as a substantially thin layer of metal.

24. The method of aligning an optical array with a substrate as in claim 23 further comprising disposing a set of conductive traces on the substrate for electrically connecting the optical array.

25. An apparatus for aligning an optical array with a substrate, such apparatus comprising:
 a first optical recognition module a substrate aligned to an alignment fixture;
 a second optical recognition module for identifying a first plurality of registration marks in the alignment fixture;
 means for identifying a second plurality of registration marks on the optical array; and
 means for attaching the optical array to the substrate such that the first plurality of registration marks of the optical array are located at a known distance from the second plurality of registration marks in the alignment fixture, with respect to a plane created by a first surface of the alignment fixture.

26. The apparatus for aligning an optical array with a substrate as in claim 25 further comprising a plurality of passive alignment guide pins in the alignment fixture inserted through a respective plurality of alignment apertures in the substrate.

27. The apparatus for aligning an optical array with a substrate as in claim 26 wherein the registration marks in the alignment fixture are further defined as a plurality of optical signals transmitted from the alignment fixture through the substrate.

28. The apparatus for aligning an optical array with a substrate as in claim 27 wherein the substrate further comprises an optically transparent substrate such that the plurality of optical signals pass directly through the substrate.

29. The apparatus for aligning an optical array with a substrate as in claim 27 wherein the plurality of registration marks disposed on the optical array are further defined as a substantially thin layer of metal.

30. The apparatus for aligning an optical array with a substrate as in claim 29 further comprising an adhesive for attaching the optical array to the substrate.

31. The apparatus for aligning an optical array with a substrate as in claim 30 further comprising a set of conductive traces disposed on the substrate for electrically connecting the optical array.

* * * * *